United States Patent [19]

Sarkomaa

[11] Patent Number: 5,342,594
[45] Date of Patent: Aug. 30, 1994

[54] FLUIDIZED BED PROCESS FOR $SO_x$ REMOVAL

[75] Inventor: Pertti J. Sarkomaa, Lappeenranta, Finland

[73] Assignee: Rauma-Repola Oy, Kaarina, Finland

[21] Appl. No.: 899,587

[22] Filed: Jun. 18, 1992

Related U.S. Application Data

[60] Continuation of Ser. No. 705,958, May 28, 1991, abandoned, which is a division of Ser. No. 302,146, Jan. 27, 1989, abandoned, which is a continuation of Ser. No. 93,781, Sep. 8, 1987, abandoned, which is a continuation of Ser. No. 774,604, Aug. 14, 1985, abandoned.

[30] Foreign Application Priority Data

Mar. 20, 1984 [FI] Finland .................................. 841126

[51] Int. Cl.⁵ .............................................. B01D 53/34
[52] U.S. Cl. .................................................. 423/244.08
[58] Field of Search ....................... 423/244 A, 244.08

[56] References Cited

U.S. PATENT DOCUMENTS 4,197,285  4/1980  Yang et al. ........................... 423/244
4,255,162  3/1981  Moss .................................... 423/244

*Primary Examiner*—Michael Lewis
*Assistant Examiner*—Stuart Hendrickson
*Attorney, Agent, or Firm*—Nixon & Vanderhye

[57] ABSTRACT

A process of removing $SO_x$ from a gas stream using a fluidized bed having a mixing chamber at the lower end for mixing the gas with $CaCO_3$, causing the gas-carbonate reaction product to rise while being cooled. Solids caught in the cyclone are separated and returned to the mixing chamber for re-use.

2 Claims, 3 Drawing Sheets

FLUIDIZED BED PROCESS FOR $SO_x$ REMOVAL

This is a continuation of application Ser. No. 07/705,958, filed May 28, 1991, now abandoned, which is a division of application Ser. No. 07/302,146, filed Jan. 27, 1989 which is a continuation of application Ser. No. 07/093,781, filed Sep. 8, 1987 which is a continuation of application Ser. No. 06/774,604, filed Aug. 14, 1985 all now abandoned.

The present invention is concerned with a two- or multi-component reactor for carrying out a chemical or physical process. The main components of the reactor are feeder devices for gaseous and/or solid materials, a reactor chamber, and a separator for solid or liquid materials.

Among multi-component reactors, in recent years, so-called fluidized-bed : reactors have rapidly become more and more common, and their main field of application has been the production of energy by means of solid fuels. In fluidized-bed reactors, the burning takes place in a solids-gas suspension, whereby the function of the solid and usually non-reactive material is to stabilize the combustion process. The fluidized-bed reactors are divided into two main groups on the basis of their mode of operation:
1) static fluidized-bed reactors, in which the carriage of solid particles along with the carrier gas is scarce, and
2) dynamic fluidized-bed reactors, in which the solid particles are carried pneumatically through the reactor.

The practical applications always include features from both static and dynamic reactors.

Advantages of dynamic fluidized-bed reactors over static reactors are, e.g. the higher cross-sectional area heat release-characteristic, and maybe the most important advantage is better mixing of the gas compounds. A drawback of the dynamic fluidized-bed reactors is absolute necessity of a solids separator. In spite of this drawback, it can be seen that, in the applications of the fluidized-bed technology, there is a tendency towards dynamic fluidized-bed reactors.

As the solids separator in dynamic fluidized-bed reactors almost exclusively a conventional cyclone is used, whose solids return duct is provided with a so-called gas lock. The function of the gas lock is to prevent flow of gas out of the reactor along the solids return duct into the cyclone. Such a gas flow would have an essentially detrimental effect on the separating capacity of a conventional cyclone. The drawbacks of a conventional cyclone separator are described almost exhaustively in the published Finnish Patent Application No. 812596 in the portion describing the prior-art technology.

In the Finnish Patent Application No. 812596, a reactor based on the use of a flow-through cyclone is described and justifications are given for its advantages as compared with a reactor based on the use of a conventional cyclone. By means of the suggested solution, obvious constructional advantages are obtained in connection with dynamic fluidized-bed applications. The most essential advantages over prior-art reactor solutions are the recirculation system based on natural circulation of the solid matter and operational and constructional advantages related to this . in the invention concerned, certain obvious operational and constructional drawbacks can, however, also be seen, the most essential of which will be discussed in the following.

On the bottom of the particle separator of a reactor in accordance with the Finnish Patent Application No. 812596, solid matter is gathered as a quantity dependent on the loading of the reactor. A gas removing pipe is indispensable for the operation of the separator, which pipe prevents mixing of the solid matter flowing onto the bottom of the cyclone into the clean gas. When the temperature is high, the pipe must be made of a ceramic material and is therefore expensive, massive, and of problematic construction. Moreover, the said pipe constitutes a substantial obstacle for the access of the solid matter gathered onto the bottom of the separator into the discharge pipe. In practice, the surface of the circulating material in the bottom part of the flow-through cyclone tends to adopt a position and shape dependent on the said material, on the reactor, and on the loading, and the said position and shape is, as a rule, unfavourable in view of the flow pattern of the cyclone. In order that a good separating ratio should be achieved, some of the volume of the cyclone is needed between the gas removing pipe and the cyclone chamber exclusively for the storage of the solid matter that is gathered.

By means of a multi-component reactor in accordance with the present invention, based on a horizontal cyclone, it is possible to eliminate the problems and drawbacks of the fluidized-bed reactors based on the use of vertical cyclones (conventional cyclone, flow-through cyclone). The reactor in accordance with the invention is characterized in what is stated in the characterizing part of claim 1.

Some of the most important advantages of the present invention are the constructional simplifications obtained in various embodiments of dynamic fluidized-bed reactors as well as operational improvements achieved as compared with prior-art reactors. When a horizontal cyclone is used, it is possible to avoid the operational and constructional drawbacks characteristic of the flow-through cyclone, resulting from the storage of the solid matter. The use of a horizontal cyclone also yields economies of investment, because the reactor becomes constructionally simple and of a small size as compared with the prior-art reactor solutions. A horizontal separator operates even more stably than a flow-through cyclone, because the removal of the solid matter is performed from the circumference of the separator chamber. The said location of the solids removing pipe also provides an increase in the carrying capacity of the discharge pipe, because, when it arrives in the discharge pipe , the solid matter has a high velocity (mass flow=-cross-sectional area $\times$ velocity $\times$ density). Owing to their said properties, the horizontal cyclones are particularly well suitable for being connected in series.

The reactor in accordance with the invention, based on a horizontal cyclone, is particularly suitable for a fully cooled reactor part of the fire-tube boiler shown in FIG. 3, because the shapes of the reactor, of the separator, and of the gas and return pipes are favourable in view of heat expansion.

BRIEF DESCRIPTION OF THE DRAWINGS

Examples on certain in embodiments of the invention are given in FIGS. 1, 2 and 3, with reference to which the invention will be described in more detail in the following.

FIG. 1 shows the construction and the mode of operation of a dynamic fluidized-bed reactor based on a horizontal cyclone as applied to combustion or, more generally, to carrying out a desired multi-component process. The process gas is passed into the reactor through the inlet opening 1 of the air chamber 2 placed in the bottom part of the reactor. Via the gas distributor plate 3 placed between the reactor chamber 5 and the air chamber 2, the gas is passed into the bottom part of the reactor chamber 5, into which the solid material separated in the horizontal separator is passed through the return pipe 9. The solid process material is fed into the reactor through the branch 12. The solid process product or waste is removed through the branch 13. The mantle 4 of the reactor chamber 5 may be cooled, and the reactor chamber may also have cooling elements. The gas containing solid matter is passed through the duct 8 tangentially to the circumference of the horizontal separator chamber 7 of the horizontal cyclone placed above the reactor chamber 5. The solid material separated out of the horizontal cyclone onto the wall is removed via a branch 6 placed on the circumference of the separator chamber, from which duct, the solid material is passed further along the return pipe 9 to the desired location of the reactor. The gases purified in the horizontal cyclone are removed via both ends of the cyclone through the openings 10. The exhaust gas branches 11 can be connected to the branches 10 tangentially, whereby some of the tangential velocity of the exhaust gas can be recovered.

FIG. 2 shows the construction of principle of a fire-tube boiler accomplished by means of a reactor of the sort shown in FIG. 1. The combustion air is passed from the air chamber 21 via the air distribution plate 22 into the combustion chamber 24, into whose bottom, part the fuel is fed through the branch 23. The reactor in accordance with the invention, operating in accordance with the principles indicated in the description of FIG. 1, is completely placed in a water space 32 and is, thus, fully cooled. The exhaust gas ducts 26 of the horizontal separator 25 pass the gases purified of solid matter into the lower reversing chamber 28. In the fire tubes 29, the gases are cooled further and pass into the upper reversing chamber 30, and from there further through the pipes 31 into the system of flue gas ducts. The solid material is returned through the pipe 27 to an appropriate level in the combustion chamber 24. The branches 33 and 34 are the inlet and outlet ducts for the cooling water.

FIG. 3 shows the reactor solution in accordance with the invention as applied to the purification of hot gases and to the recovery of heat, accomplished by means of two flow-through cyclones connected in series. The hot gases to be purified are passed into the reactor through the opening 41. In the bottom part of the reactor space, there is a mixing chamber 42, into which the solid material is returned through the return pipes 44 and 53, and into which the necessary solid process material, if any, is fed (e.g., $CaCO_3$ for the absorption of sulphur oxides) through the branch 57. If necessary, process material or waste (e.g., $CaSO_4$) can be removed out of the mixing space 42 through the branch 56. The solid materials and the gas rise through the pipes 43 into the collecting space 45. Through the branch 46, the gases containing solids are passed tangentially to the circumference 47 of the first horizontal cyclone. The pre-purified gases are removed out of the first separator through one end or both ends of the separator chamber through the openings 48. The separated solid matter is returned into the mixing part 42 through the pipe 4. Through the branch 49 the pre-purified gases are passed to the circumference of the separator chamber 50 of the second horizontal separator. The pure gases are removed through the ends of the second horizontal separator through the openings 51. The separated solid matter is returned through the discharge pipe 53 into the mixing part 42. In order to reduce losses of pressure, the gas ducts 49 and 52 are attached to the discharge openings 48 and 51 tangentially. The cooling of the reactor part in FIG. 3 is accomplished as a fire-tube construction, whereby the tubes 43 and 44 are located in a water space 15 formed by the mantle 54.

From the horizontal separator shown in FIG. 1, the gases are removed symmetrically, and the ends of the separator chamber are conical. It is clear that the ends of the separator chamber may also be plane and that the gas may also be removed from one side only. If necessary, the discharge pipes 10 of the horizontal separator may also extend into the separator chamber 7. In FIG. 1, a practical connection between the reactor chamber and the horizontal separator is shown, but it is clear that the separator may be located, e.g., eccentrically relative the reactor chamber and that the return duct for the solid matter may also be located outside the reactor chamber.

Figure 1:
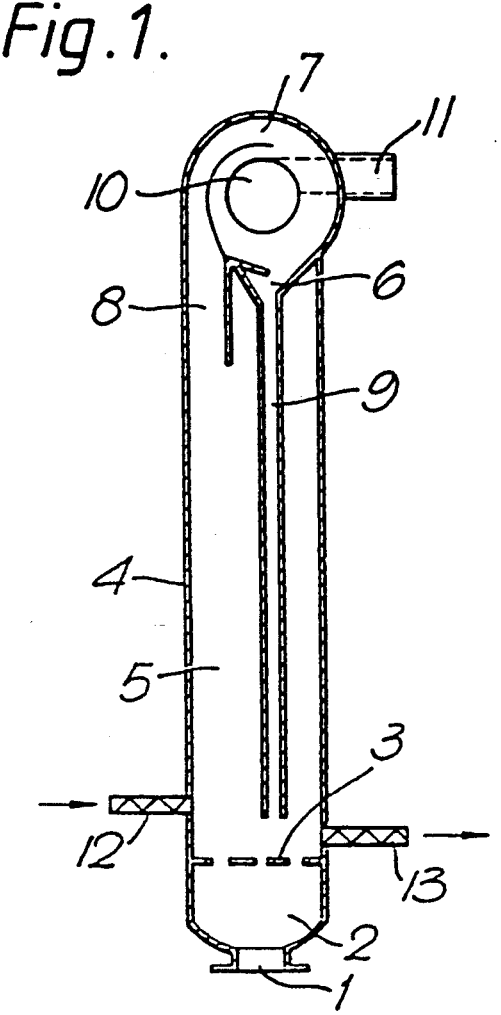
FIG. 1 shows a dynamic fluidized-bed solution in accordance with the invention as applied to combination under complete or partial oxygenation, or for carrying out a certain chemical or physical process.
Figure 1A:
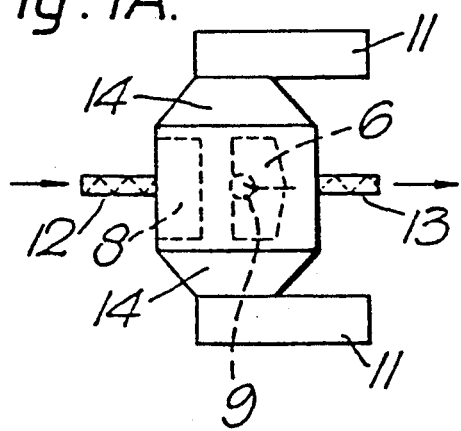
Figure 2:
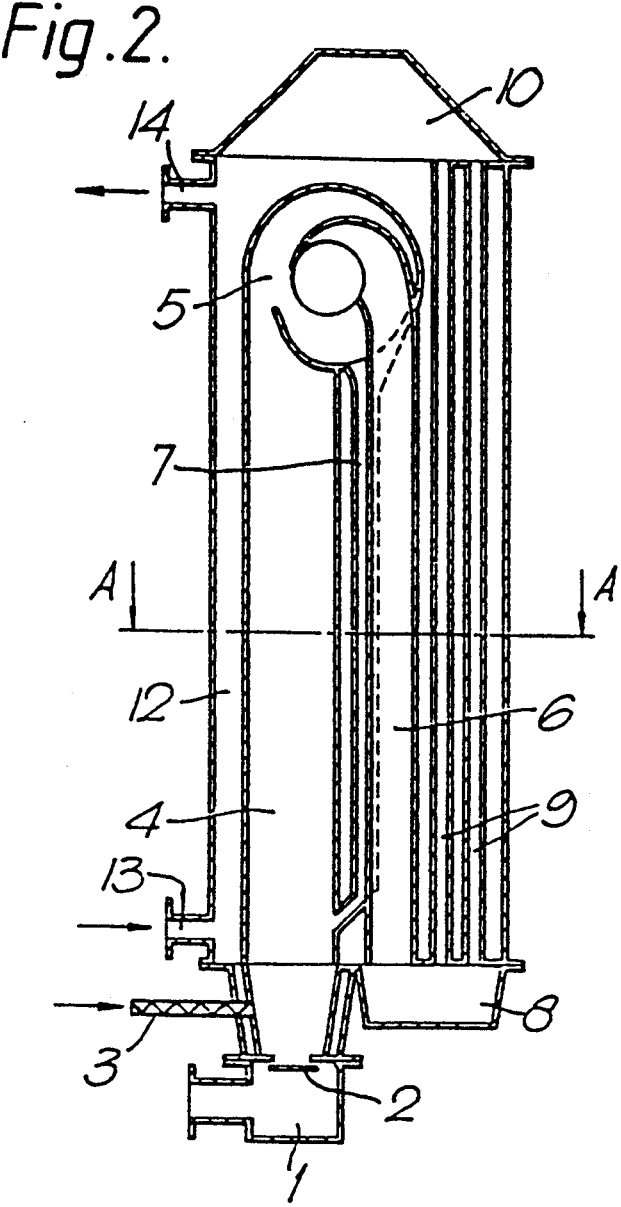
FIG. 2 shows a reactor solution in accordance with the invention as a part of a fire-tube boiler.
Figure 2A:
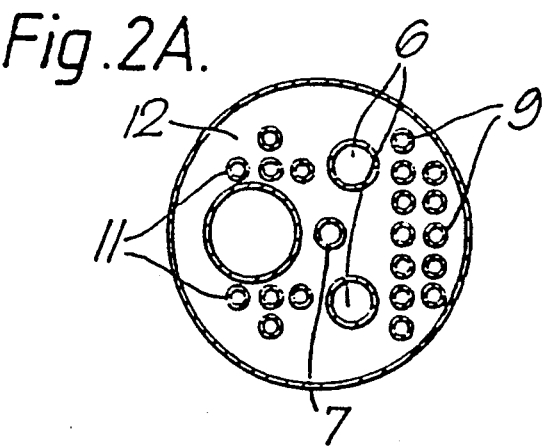
Figure 3:
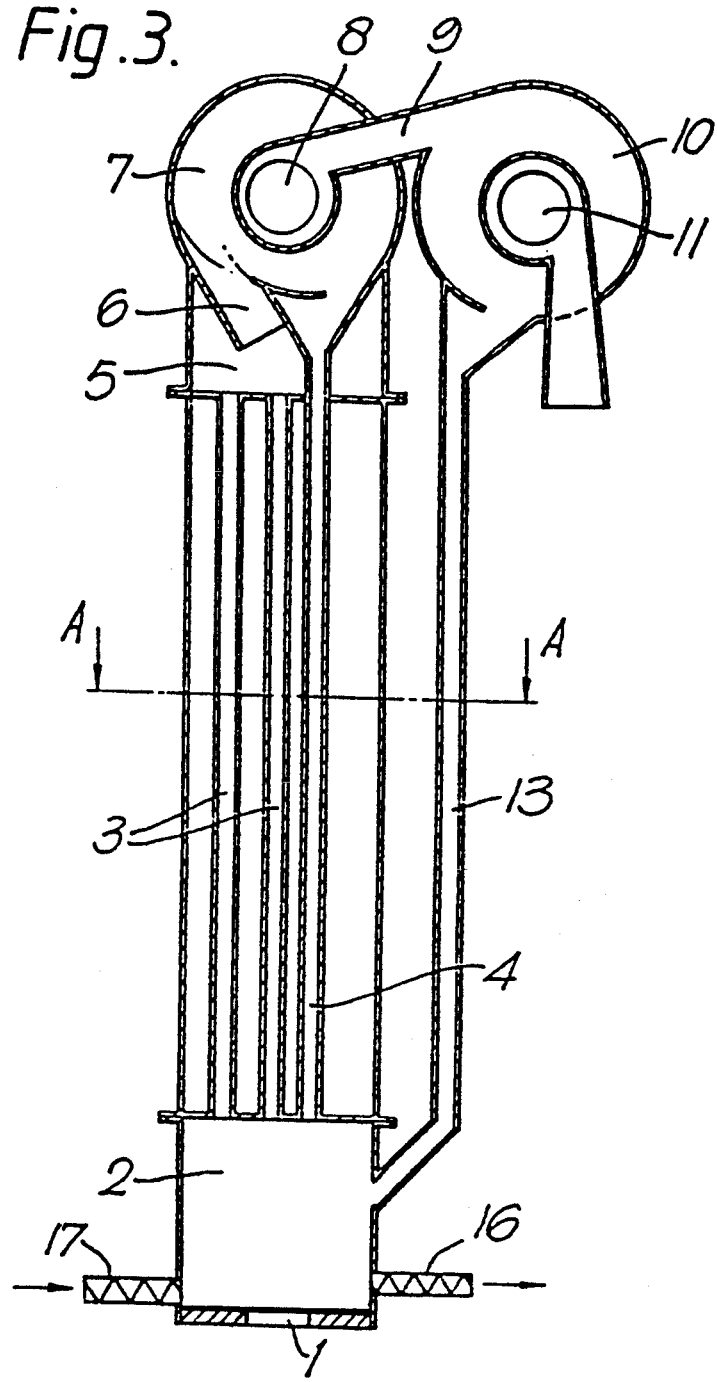
FIG. 3 shows a reactor solution in accordance with the invention as applied to the cooling, heat recovery, and purification of hot gases possibly containing gaseous and/or molten and vaporous and/or solid impurities.
Figure 3A:
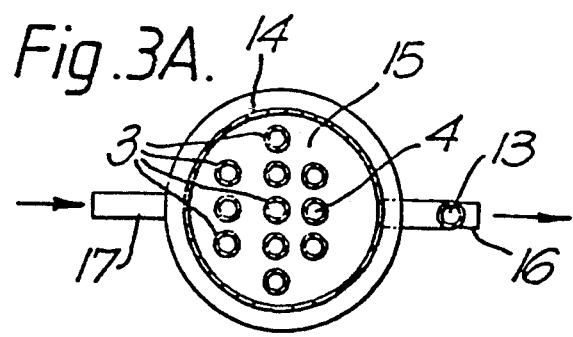

The cooling part of the embodiment shown in FIG. 3 consists of fire tubes placed inside the mantle. It is obvious that the cooling may also be accomplished by means of water tube constructions. It is also evident that, if necessary, even more than two separators may be connected in series and/or in parallel.

Even otherwise, it should be stated that, above, the reactor invention has been described just in the light of three exemplifying embodiments. This is, however, not supposed to confine the field of application of the invention concerned to the given example cases only. It is also obvious that, in the present application, different modifications can be produced of the basic solutions, which said modifications are inventionally included in the scope of the present application.

What is claimed is:

1. A method of purifying and cooling hot, unclean gases containing impurities including sulphur oxides comprising the steps of:
    (a) passing hot, unclean gases having gaseous sulphur oxide-containing impurities into a mixing chamber provided in a lower end of a fluidized bed reactor and mixing said hot, unclean gases therein with a solid process material comprising $CaCO_3$ such that the gaseous sulphur oxide-containing impurities react with said $CaCO_3$ to form a solid impurity reaction product thereof;
    (b) causing said unclean gases and said solid process material along with said solid impurity reaction product to rise in the reactor to a collection space while simultaneously cooling said unclean gases, said process material and said solid impurity reaction product within a cooled region of the reactor;

(c) passing said unclean gases, said solid process material and solid impurity reaction product from said collection space tangentially to a circumferential surface of a first horizontal cyclone separator;

(d) separating said solid process material and said solid impurity reaction product from said unclean gases to provide purified gases, and removing said purified gases from at least one end of the first horizontal cyclone separator; and (e) returning separated solid impurity reaction product and solid process material to said mixing chamber for mixing with hot unclean gases in accordance with step (a).

2. A method of purifying and cooling hot unclean gases containing impurities including sulphur oxides in a dynamic fluidized bed reactor having a reactor chamber with upper and lower ends; a bed of solid $CaCO_3$ particles in the reactor chamber; cooling surfaces within the reactor chamber between the upper and lower ends; a mixing chamber in the lower end of the reactor; first and second inlets in said mixing chamber; a first outlet in the upper end of the reactor; a second outlet in the mixing chamber; a first horizontal cyclone separator disposed at the upper end of the reactor in communication with the first reactor outlet and including an exhaust gas outlet; and a return pipe connected between the cyclone separator and the mixing chamber; the method comprising the steps of:

(a) fluidizing said bed of solid particles;

(b) introducing hot unclean gases having gaseous sulfur oxide containing impurities into said reactor through said first inlet, such that the gaseous sulphur oxide containing impurities react with said solid $CaCO_3$ particles to form a solid impurity reaction product;

and wherein a suspension of said solid $CaCO_3$ particles, solid impurity reaction product, and hot unclean gases rises in said reactor chamber and in introduced into said horizontal cyclone separator through said first outlet;

(c) simultaneously cooling said suspension within a cooled region of the reactor as said suspension flows upwardly from said mixing chamber to said first outlet;

(d) separating said solid $CaCO_3$ particles and solid impurity reaction product from said suspension in said cyclone separator;

(e) returning separated and cooled solid $CaCO_3$ particles and solid impurity reaction product to said mixing chamber through said return pipe; and (f) discharging purified gas from said exhaust gas outlet.

* * * * *